Nov. 9, 1954
R. C. ALLEN
2,693,751
TOAST WARMER
Filed July 1, 1949
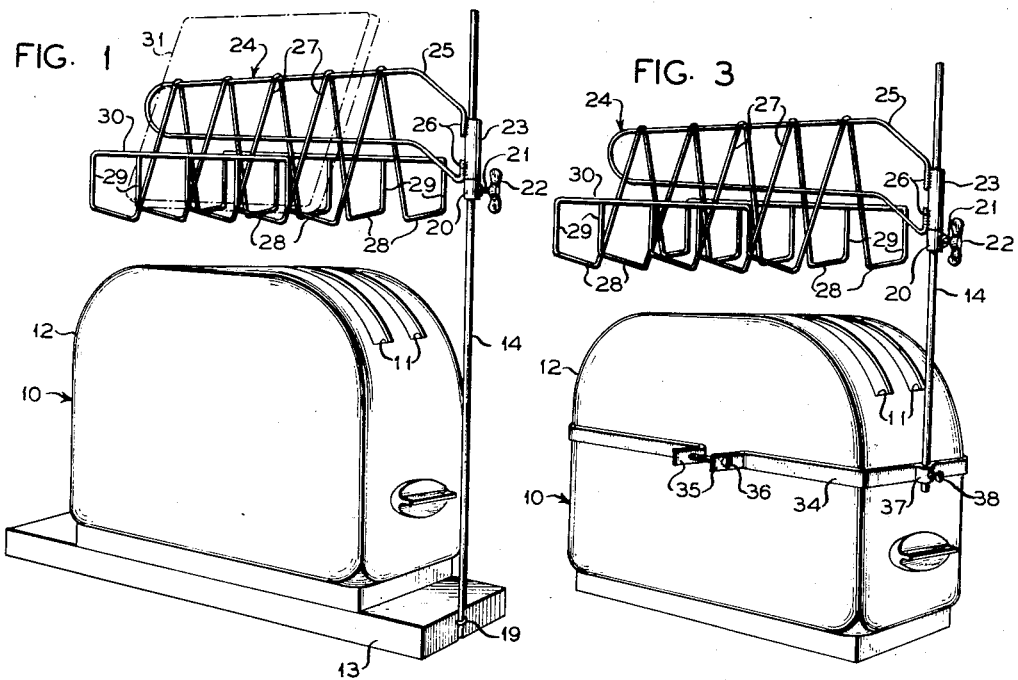
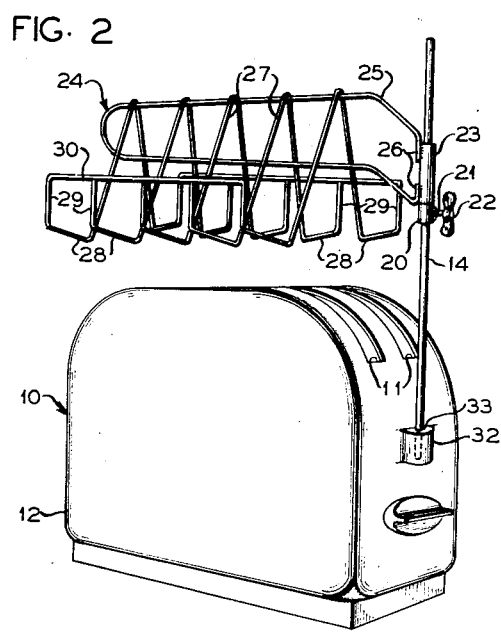
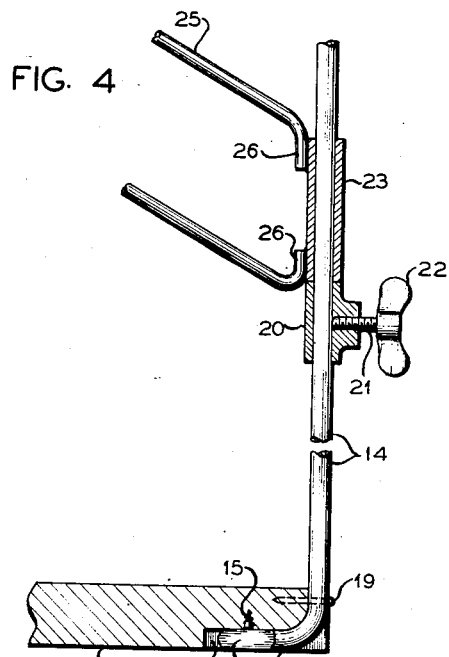
INVENTOR.
RUTH C. ALLEN
BY
A. Yates Dowell
ATTORNEY United States Patent Office 2,693,751
Patented Nov. 9, 1954

2,693,751

TOAST WARMER

Ruth C. Allen, Raleigh, N. C.

Application July 1, 1949, Serial No. 102,665

4 Claims. (Cl. 99—339)

This invention relates to the preparation of food and more particularly to a rack for supporting toast or the like above a toaster to maintain the same in a warm condition prior to use.

As is well known, the majority of commercially available toaster appliances provide no means for maintaining the toast warm after the same has been toasted. Consequently it has been necessary to utilize the toast immediately after toasting which many times results in delay or to prepare a quantity of toast in which the earlier prepared slices will cool before consumption.

Heretofore numerous solutions to this problem have been offered. Among them are the provisions of pockets on the sides of the toaster for receiving toasted slices, the provision of drawers within the toaster and with some of the earlier appliances a shelf above the toaster and usually forming an integral part thereof. These proposed solutions to the problem, while being to some extent effective, were in many instances expensive, cumbersome to use, inefficient and failed to provide a convenient, relatively inexpensive toast warmer usable with the various types of modern pop-up toasters.

It is, therefore, an object of this invention to provide a toast warming rack having a base to support the toaster and to support a rack above the toaster, this rack being adjustable as to height and also swingable laterally from above the toaster in order to permit the convenient insertion and removal of slices therefrom.

It is a further object of the invention to provide a toast warming rack having an upstanding rod supported by a socket forming an integral part of the toaster and in which the rack is slidably and swingably mounted on the rod in order to adjust the same for the proper degree of heat and at the same time to permit movement out of the way to facilitate insertion and removal of the slices.

It is a further object of the invention to provide a toast warming rack having clamp means for securing the same to a variety of toasters.

It is a further object of the invention to provide a toast warming rack which may be conveniently sold either as an integral part of the toaster or as an accessory to be utilized with various toasters and which may be economically constructed of readily available material utilizing a minimum of skilled labor and saleable in a high competitive market.

Further objects and advantages of the invention will be apparent from the following description taken in conjunction with the accompanying drawings, wherein:

Fig. 1 is a perspective view of one form of the toast warming rack and showing a conventional pop-up toaster in place on the base thereof;

Fig. 2, a perspective view similar to Fig. 1, showing the toast warming rack supported in a socket formed as an integral part of the toaster;

Fig. 3, a perspective view similar to Fig. 1, showing the toast warming rack supported on a clamp applied to a conventional pop-up toaster; and Fig. 4, a fragmentary sectional view showing the manner of attachment of the rack to the supporting rod and the supporting rod to the base.

With continued reference to the drawing, there is shown a conventional toaster 10 of the pop-up type having slots 11 in the upper surface thereof adapted to receive slices of bread to be toasted. As is well known these slices are positioned within the slots 11 and an operating knob depressed to lower the slices within the outer casing 12 and after a predetermined period of time the toasted slices are projected upwardly and come to rest with the upper portions thereof projecting above the upper surface of the casing 12. In normal use of the toaster 10, the toasted slices are removed and consumed but where it is necessary to supply toast for a relatively large gathering the speed of operation of the toaster is not sufficient to keep pace with the demand and therefore it is necessary to either prepare a supply of toast in which case some of the slices become cool prior to consumption, or to prepare toast as utilized, in which case it is necessary to await operation of the toaster.

This invention is intended to alleviate this undesirable situation and one form of the invention as shown in Fig. 1 contemplates the provision of a base 13 which may be constructed of wood, plastic, metal or other desired material, this base being of the proper dimensions to receive and support the toaster 10. At one end of the base there is secured an upstanding rod 14, this rod being conveniently secured in position as shown in Fig. 4 by screw threaded means or the like 15 extending through an eye 16 in a portion of the rod 17 extending at substantially right angles to the upstanding portion of the rod. The portion 17 and eye 16 may be conveniently positioned in a recess 18 in the base 13 in order that no portion thereof will project below the bottom surface of the base and interfere with the proper support thereof on a table top or the like. If desired, the rod 14 may further be secured in place on the base 13 by a staple or the like 19 surrounding the rod 14 and driven into the material of the base.

Received on the rod 14 is a collar 20 which may be located at any desired position above the base 13 and retained in this position by a set screw 21 threadedly received in the collar 20 and engaging the rod 14 to securely lock the collar in position. Set screw 21 may be provided with finger engaging portions 22 for convenient manipulation thereof. Slidably and swingably received on the rod 14 above the collar 20 is a sleeve 23, this sleeve serving to support the toast receiving rack 24.

The rack 24 may be conveniently formed of wire, the main supporting frame therefor comprising a looped or generally U-shaped wire member 25 having angularly disposed ends 26 secured to the sleeve 23 by welding or the like. Secured to the frame 25 at spaced intervals are a plurality of generally U-shaped downwardly extending diverging wire members 27, these members having outwardly extending portions 28 and upwardly extending portions 29. The end members 27 are preferably formed from a single piece of wire and at the upper extremity of portion 29 are bent at right angles to extend longitudinally of the rack and provide an upper rail 30. The upwardly extending portions 29 of the intermediate members 27 are secured to rail 30 by welding or the like. This structure provides a two section rack in which slices of toast 31 may be positioned on each side of the frame 25 in close proximity to the upper surface of the toaster 10 in order to maintain the slices 31 warm prior to consumption thereof. Obviously, if desired, the rack could be formed of sheet metal or materials other than wire.

In operation the toaster 10 is positioned on the base 13 and the collar 20 locked on the rod 14 by tightening set screw 21 to support the rack 25 in the desired spaced relation to the upper surface of toaster 10. Since rack 25 and sleeve 23 are rotatable about rod 14 the rack may be swung to the side during insertion and removal of slices from the toaster 10 and upon completion of the toasting operation the slices are placed in the rack as shown, new slices inserted in the toaster and the rack swung back into position over the toaster to maintain the slices supported therein warm.

A modified form of the invention is shown in Fig. 2, in which the rack and supporting rod 14 are identical with the structure shown in Fig. 1 and described above, the difference being that a boss or the like 32 is provided on the casing 12 of the toaster, this boss having a vertically disposed socket 33 for receiving and supporting rod 14. This modification is intended to apply where the toaster and rack are manufactured and sold as a complete appliance.

A further modified form of the invention which may be sold separately from the toaster as an accessory is shown in Fig. 3, and in this instance the rack and supporting rod 14 are identical with the structure shown in Fig. 1 and described above. In this modification the rod 14 is supported by a clamp 34 comprising a metallic strap extending around the toaster and being provided with ears 35 for receiving a screw threaded fastening means or the like 36 which serves to tightly clamp the strap 34 in position around the casing 12 of the toaster 10. Strap 34 is provided at one end thereof with a boss 37 having a vertically disposed aperture extending therethrough for reception of the rod 14. Rod 14 is secured in adjusted position by a set screw or other equivalent means 38 threadedly received in the boss 37 and tightly engaging the rod 14.

The various modifications described above all operate in substantially the same manner and serve to provide a device which may be conveniently utilized with an existing toaster or which may be adapted for use on only a single type of toaster and sold therewith as a unit. The modification disclosed in Fig. 1 may be utilized with any toaster while that disclosed in Fig. 3 may be used with any toaster to which the clamp 34 may be applied, and of course a wide variety of such clamps may be supplied in order to adapt the device to all existing types of toasters. This invention serves to provide a relatively inexpensive device which is simple, fool-proof in operation, and which efficiently performs the function for which it is intended.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. In combination with a toaster including a heating element, an upstanding supporting rod, a collar slidably received on said rod, means for retaining said collar upon said rod in adjusted position, a sleeve rotatably and slidably disposed on said rod and supported by said collar, a toast receiving rack comprising a wire frame secured to said sleeve and extending above said heating element, a plurality of downwardly extending diverging wire members secured to said frame and providing supports for a plurality of slices of toast on opposite sides of said frame whereby said rack may be selectively positioned over said heating element to warm toast supported upon said rack or may be rotated out of the vertical plane of said heating element to facilitate operation of said toaster, and means for vertically adjusting said rack including an expansible and contractable clamp disposed about said toaster, a vertically disposed aperture in said clamp adjacent one end of said toaster, said upstanding rod being reciprocably received in said aperture, and means for securing said rod in adjusted position.

2. In combination with a toaster including a heating element, an upstanding supporting rod, a collar slidably received on said rod, means for retaining said collar in adjusted position, a sleeve rotatably disposed on said rod and supported upon said collar, a toast supporting rack comprising a wire frame secured to said sleeve and extending above said heating element, a plurality of downwardly diverging wire members secured to said frame and providing supports for slices of toast on opposite sides of said frame whereby said rack may be selectively positioned over said heating element to warm toast supported upon said rack or may be rotated out of the vertical plane of said heating element to facilitate operation of said toaster, and means for vertically adjusting said rack including an expansible and contractable clamping member disposed about said toaster, a vertically disposed aperture in said clamping member, said upstanding rod being reciprocably received within said aperture for vertical adjustment, and means for securing said rod in adjusted position.

3. A toast warmer for use with a toaster having a heating element comprising an expansible and contractible clamp adapted to be disposed in a substantially horizontal position about said toaster and the elevation of which can be varied, said clamp having an aperture disposed transversely thereof, a supporting rod adapted to be reciprocally received in said aperture in upstanding position, means for securing said rod in adjusted position, a collar slidably received on said rod, means for retaining said collar in adjusted position upon said rod, a sleeve rotatably and slidably disposed on said rod and supported by said collar, a toast receiving rack comprising a frame secured to said sleeve and adapted to be disposed above said toaster, said rack having a plurality of downwardly extending diverging members secured to said frame and providing supports for a plurality of slices of toast on opposite sides of said frame, said rack being selectively rotatable from a position over said heating element where toast supported on said rack may be heated to a position where access to the toaster is provided.

4. The combination with a toaster having a housing provided with a heating element and bread receiving slots, an upstanding supporting rod, a collar slidably received on said rod, means for retaining said collar upon said rod in adjusted position, a sleeve rotatably and slidably disposed on said rod and supported by said collar, a toast receiving rack comprising a frame secured to said sleeve and extending above said heating element, a plurality of downwardly extending diverging members secured to said frame and providing supports for a plurality of slices of toast on opposite sides of said farme, said rack being selectively rotatable from a position over said slots and heating element to warm toast supported upon said rack to a position to afford access to said toaster, and means for supporting said upstanding supporting rod in operative position on said housing.

References Cited in the file of this patent

UNITED STATES PATENTS

| Number | Name | Date |
|---|---|---|
| Re. 13,060 | Andrews | Dec. 28, 1909 |
| 354,562 | Mathews | Dec. 21, 1886 |
| 462,048 | Jenne | Oct. 27, 1891 |
| 505,360 | Hilliard | Sept. 19, 1893 |
| 508,861 | Bisel | Nov. 14, 1893 |
| 732,470 | Tatham | June 30, 1903 |
| 995,982 | Moore et al. | June 20, 1911 |
| 1,180,881 | Ricciardelli | Apr. 25, 1916 |
| 1,228,956 | Noonan | June 5, 1917 |
| 1,423,612 | Jewett | July 25, 1922 |
| 1,539,042 | Dennis | May 26, 1925 |
| 1,714,536 | Wooderson | May 28, 1929 |
| 1,926,938 | Fitzgerald | Sept. 12, 1933 |
| 1,953,396 | Dunn | Apr. 3, 1934 |
| 1,972,505 | Wilson | Sept. 4, 1934 |
| 1,981,294 | Wangen | Nov. 20, 1934 |
| 2,060,711 | Wright | Nov. 10, 1936 |
| 2,359,189 | Alsdorf | Sept. 26, 1944 |
| 2,397,902 | McDill | Apr. 2, 1946 |
| 2,482,068 | Larsen | Sept. 13, 1949 |
| 2,556,520 | Bunce | June 12, 1951 |

FOREIGN PATENTS

| Number | Country | Date |
|---|---|---|
| 109,923 | Great Britain | Oct. 4, 1917 |
| 234,602 | Great Britain | June 4, 1925 |